May 25, 1948.  A. R. NETTENSTROM  2,442,142
UPSET FORGING APPARATUS
Filed Jan. 10, 1945  3 Sheets-Sheet 1

INVENTOR
Arthur R. Nettenstrom
BY Wallace and Cannon
ATTORNEYS

May 25, 1948.  A. R. NETTENSTROM  2,442,142
UPSET FORGING APPARATUS
Filed Jan. 10, 1945 3 Sheets-Sheet 2

INVENTOR
Arthur R. Nettenstrom
BY Wallace and Cannon
ATTORNEYS

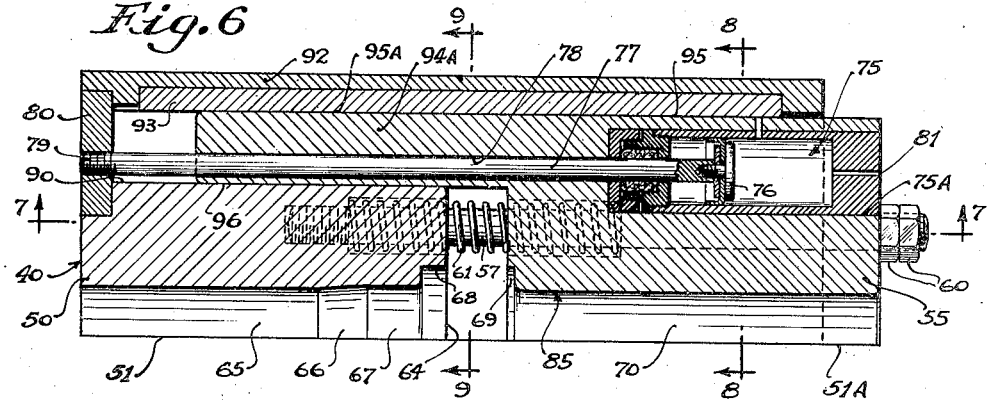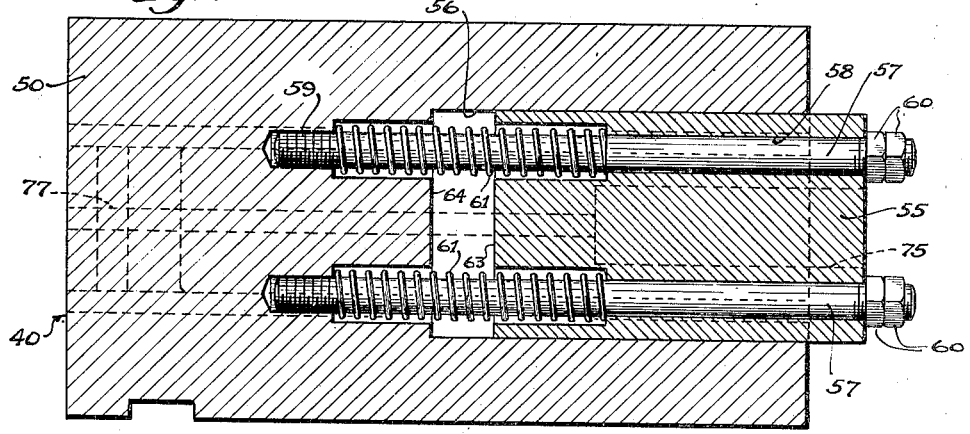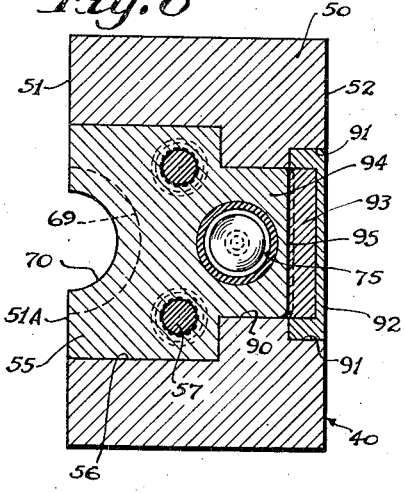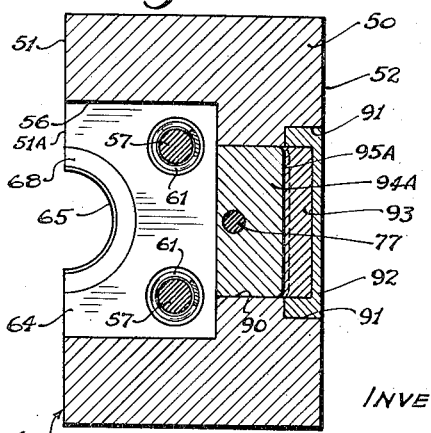

Patented May 25, 1948

2,442,142

UNITED STATES PATENT OFFICE 2,442,142

UPSET FORGING APPARATUS

Arthur R. Nettenstrom, Chicago, Ill., assignor to American Brake Shoe Company, Wilmington, Del., a corporation of Delaware Application January 10, 1945, Serial No. 572,175

4 Claims. (Cl. 78—61)

This invention relates to upset forging and particularly to sliding dies utilized in upset forging for producing an upset on the work piece in spaced relation to the end thereof.

In those instances where an enlarged portion or flange is to be formed on a work piece by upset forging in spaced relation to the ends of the work piece or rod, two different kinds of forging dies and headers have been utilized selectively in accordance with the form that was to be attained in the portions of the work piece between the upset and the ends of the work piece. Thus where it was permissible to have a tapered or cone-shaped form on the rod between the upset and one end of the work, it has been customary to use what is termed a hollow header to embrace the projecting end of the heated rod and to force the desired upset of an intermediate portion of the rod in the upset cavity of the gripping dies. The employement of such a hollow header involves the use of more material than would be required if the taper or cone could be eliminated, and this of course is objectionable; and moreover, there are many instances where at least a part of both end portions of the work piece must be formed or maintained in truly cylindrical form. Thus where a hollow header is employed, the taper on one end portion of the rod may in such an instance require removal by machining processes.

Where such taper on one end portion of a work piece has been considered objectionable, resort has been had to gripping dies having slide elements operable to grip all or part of the end portion of the stock between the upset cavity and the heading tool, thereby to control the action of the heading tool and govern the size and form of the portion of the rod embraced by such slide elements.

The slide elements of such dies serve of course as gripping dies for at least a portion of the length of the work piece so that great pressure must be applied through the bearings of the slide elements in order to attain the desired gripping and sizing action on the work piece. Such pressure is applied laterally through the sliding bearing surfaces and acts to resist the necessary sliding movement of the slide elements, and in the course of an upsetting operation the slide movement is further resisted by the extreme outward or lateral pressures exerted on the slide elements by the metal adjacent to the upset cavity of the die. These added lateral pressures vary of course with the nature of the forging that is being produced, but in prior sliding die constructions the resultant shifting or tilting of the slide elements and the uneven distribution of such pressures or forces in or over the slide bearings has resulted in rapid cutting and wearing of the bearing surfaces that slidably support the slide elements of the dies. Efforts have been made to minimize such wear in the bearing surfaces of prior sliding dies through the provision of different kinds and combinations of bearing surfaces, but even the best bearing surface materials heretofore employed have failed to maintain accurate guiding of such a slide for a full day of production use of a sliding die. The objectionable wear that develops in the bearings of sliding dies of prior construction serves of course to allow separation of the opposed slides, and this causes oversize form and parting line flash on that portion of the work piece that is embraced by the slides. It is therefore an important object of the present invention to reduce wear in the bearings of sliding dies used for upset forging work, and related objects are to enable sliding dies to be used advantageously and economically in high production work, and to enable accuracy of size and form to be maintained in upset forgings produced through the use of sliding dies.

It is, of course, well known that in the course of forging operations of this kind there is an appreciable scale formed on the surface of the work piece, and such scale is usually removed immediately after completion of each pass or forging operation by turning the work piece while maintaining the same in contact with one of the gripping dies. The presence of this scale on the forging and in and about the elements of the forging machine constitutes a continual source of trouble in the bearings of the various elements of the forging machine, and where sliding dies have been utilized in an upset forging machine, such scale has resulted in rapid wearing of the sliding bearing surfaces that serve to guide the sliding die. As a result of the extremely large pressures exerted on the die in a machine of this character, the wearing action resulting from the presence of such scale or other foreign particles between sliding surfaces of the dies has resulted in extremely fast wear of such bearing surfaces of the sliding dies, and this extremely fast wear has caused such sliding dies to have a very short useful life. It is, therefore, a further object of the present invention to enable these bearing surfaces of a sliding die to be protected from the scale or other abrasive substances that are present in and about a forging machine when in use.

Other and further objects of the present invention will be apparent from the following description and claims are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 6 is a horizontal sectional view of one of the gripping dies, the view being taken substantially along the line 6—6 of Fig. 3;

Fig. 7 is a vertical sectional view of one of the gripping dies taken substantially along the line 7—7 of Fig. 6.

Fig. 8 is a transverse sectional view of one of the gripping dies taken substantially along the line 8—8 of Fig. 6; and Fig. 9 is a transverse sectional view taken substantially along the line 9—9 of Fig. 6.

Figure 3:
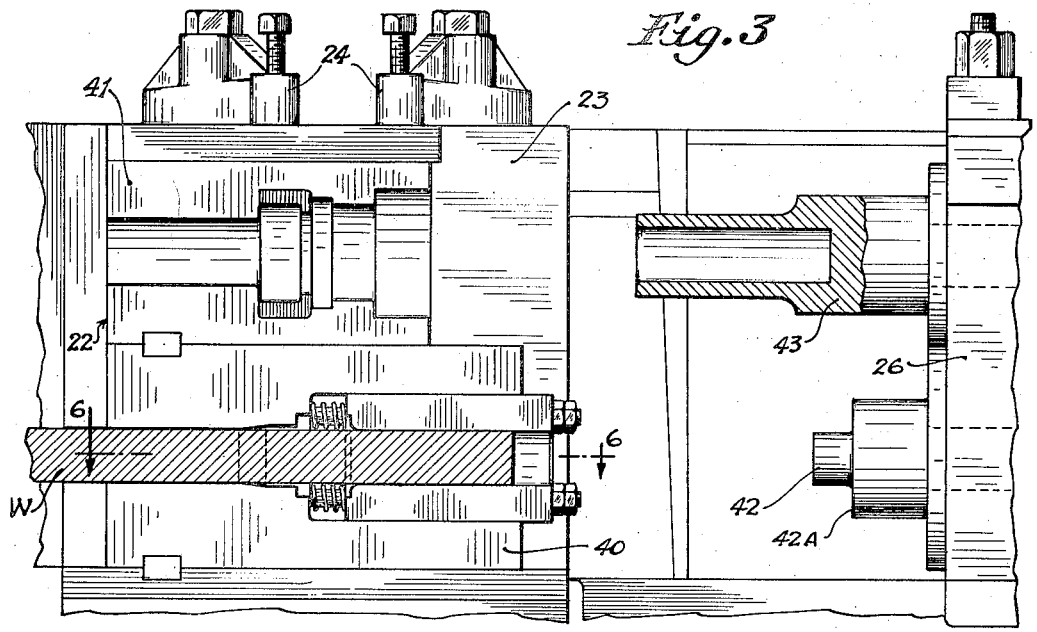
Fig. 3 is an enlarged fragmental sectional view taken vertically along the parting line of the gripping dies and illustrating the relationship of the parts when the heading slide is in its retracted position.
Figure 4:
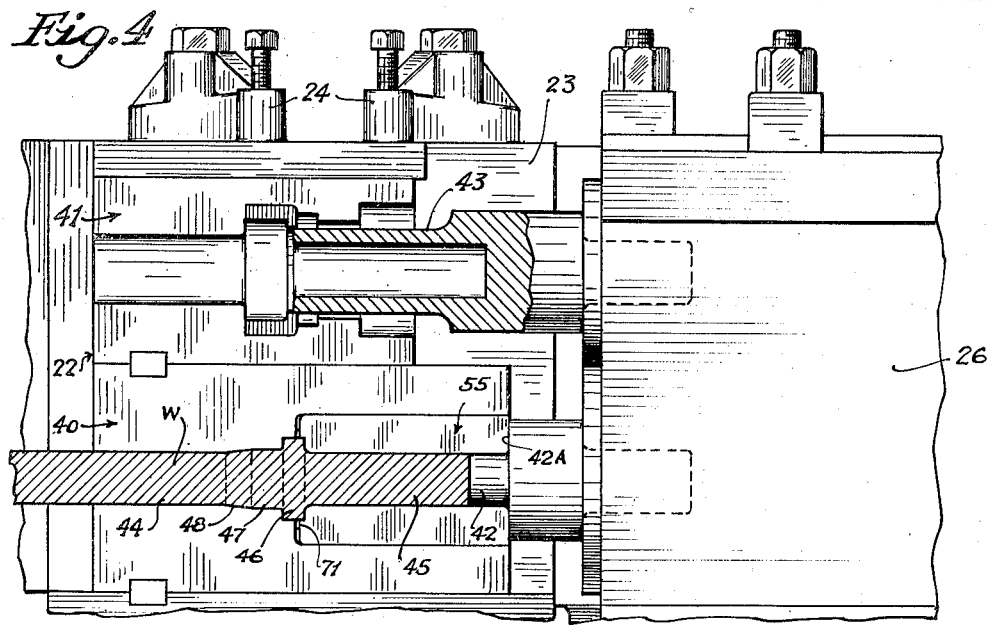
Fig. 4 is a view similar to Fig. 3 and illustrating the relationship of the parts when the heading slide has completed its advancing movement.
Figure 5:
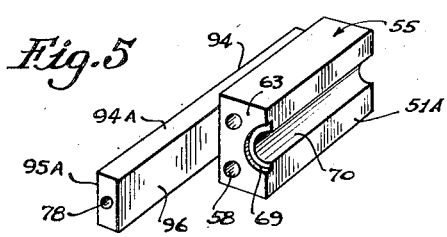
Fig. 5 is a perspective view of one of the slides of the present invention.

For purposes of disclosure, the present invention has been illustrated as embodied in the dies of an upset forging machine 10 having a relatively heavy frame or bed 11 that is normally mounted so as to extend substantially below the floor level 12 indicated in Fig. 1. Within the forward or left hand end of the bed 11, as viewed in Fig. 1, and above the floor level 12, the bed 11 is provided with a throat 13 into which the end of a heated rod or work piece W, Figs. 3, 4 and 5, is extended to have the upset forging operation performed thereon. The throat 13 is defined on one side thereof by an upstanding side wall 14 of the bed while at the other side, the throat 13 is defined by a column 15 that is formed integrally with the bed 11. The wall 14 serves as a support upon which the stationary gripping dies 20 are mounted by conventional means including clamp members 21. The movable gripping dies 22 that are opposed to the stationary gripping dies are carried on a grip slide 23 and are secured thereto by a conventional means including clamp members 24. The grip slide 23 is slidably guided or moved transversely of the machine and toward and away from the stationary gripping dies 20 by bearing means afforded on the rear surface of the column 15 and by bearings afforded on the forward surface of a portion 25 of the frame as indicated in Fig. 2 of the drawings. Immediate rearwardly of the gripping dies 20 and 22, as shown in Figs. 1 and 2 of the drawings, a heading slide 26 is mounted for reciprocation along a horizontal path toward and away from the gripping dies 20 and 22, and such reciprocation is imparted to the heading slide 26 by means including a pitman 27 that embraces an eccentric 28 on the main drive shaft 29 of the machine.

The heading slide 26 is, of course, maintained in its rearward or retracted position until such time as the gripping dies 22 have been moved into gripping relation to the stop or work piece W, and the required gripping movement of the grip slide 23 is imparted thereto by an actuating connection from the main drive shaft 29. Thus, as shown in Fig. 2 of the drawings, actuating toggles 30 are positioned between the grip slide 23 and the other side wall 31 of the bed 11, and the central pivot of the toggles 30 is connected by a link 32 to a horizontal transmitting slide 33 mounted in the bed between the toggles 30 and the main drive shaft 29. A cam 34 on the main drive shaft 29 is arranged to engage a follower roller 35 on the slide 33, and in the rotation of the shaft 29, the cam 34 operates to straighten the toggles 30 and thereby effect gripping movement of the movable gripping dies 22. After operation of the heading slide 26, another cam 36 on the main drive shaft 29 operates on a cam roller 37 that is connected to the slide 33 in a conventional manner to return the slide 33 in a rearward direction and thereby release the toggles 30 and open the gripping dies.

Figure 1:
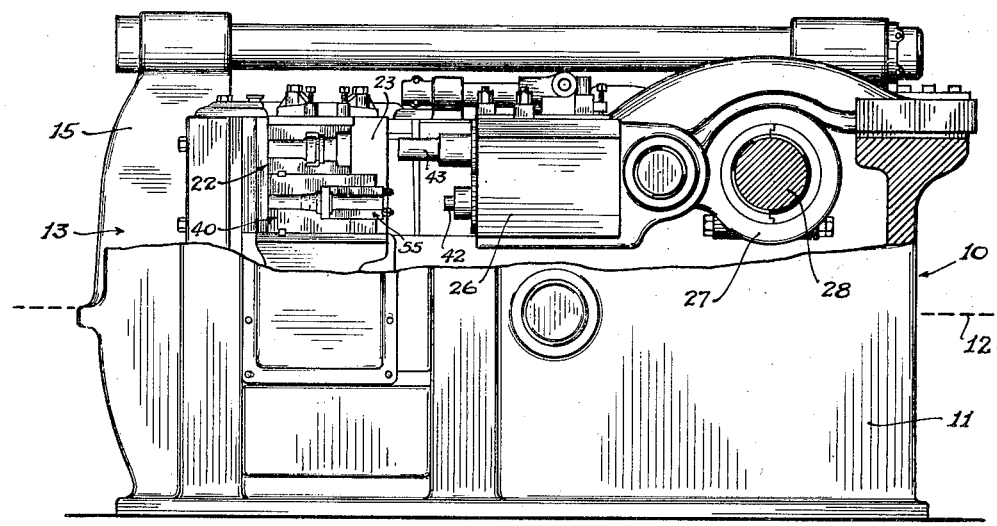
Fig. 1 is a side elevational view of an upset forging machine, taken partially in vertical section, and illustrating an upset forging die embodying the features of the invention.
Figure 2:
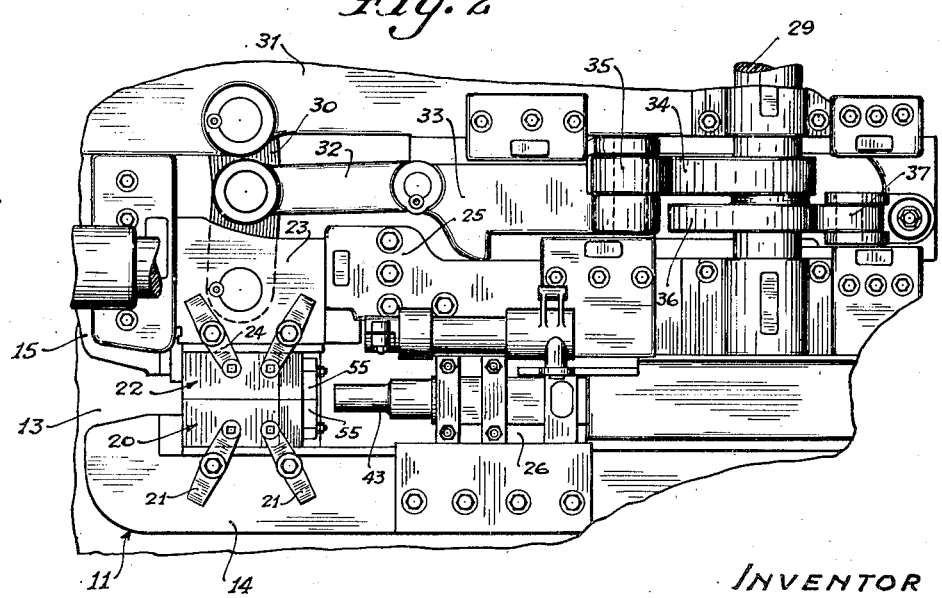
Fig. 2 is a fragmental plan view of the upset forging machine shown in Fig. 1.

The dies 20 and 22 that are mounted in an upset forging machine of the character shown in Figs. 1 and 2 may be such as to provide for several forging operations or passes that are performed in succession on the work by moving the work from one set of dies to another, but in the present instance, a relatively simple setup of the machine is illustrated wherein a single forming pass or operation is performed on the work after which a trimming pass or operation is performed on the work. Thus as will be evident in Figs. 1 3 and 4, the forming pass or operation is performed in a sliding die 40 that embodies the features of this invention and is mounted in the forging machine in association with a trimming die 41, and a heading tool 42 is mounted in the heading slide 26 for cooperation with the sliding die 40 while a trimmer punch 43 is mounted in the heading slide 26 for cooperation with the trimming die 41. The trimming operation and the form of the trimming die 41 and the trimmer punch 43 are conventional and may be of any desired construction.

The sliding die 40 is constructed in accordance with the present invention so that the form and dimensions of the work piece W will be maintained throughout relatively long production runs of the die. The work piece W for the production of which the illustrated die 40 is particularly adapted is formed from round rod stock, as shown in Fig. 3 of the drawings, so as to afford opposite end portions 44 and 45 that are accurately controlled as to diameter, and intermediate the end portions 44 and 45, an upset in the shape of a annular flange 46, a cylindrical portion 47 and a tapered portion 48 is formed through the action of the sliding die of the present invention. The sliding die of this invention of course includes opposite matching die elements that serve respectively as the stationary gripping die and the movable gripping die, and since these matching die elements are duplicates, the details of structure of but one of the matching die elements has been illustrated herein.

As will be evident in Figs. 3, 4 and 6, the die structure 40 comprises a main die block 50 that is rectangular in its general form so as to afford a parting face 51, that is adapted to match the parting face of the opposed gripping die, and a pressure face 52 that is arranged to rest against the mounting face such as the face of the gripping slide 23. The die block 50 has a sliding die block 55 mounted therein, as will hereinafter be described in detail, so that the sliding die block 55 has a parting face 51A that lies in the same plane as the parting face 51 of the main die block 50, and to afford a mounting for the sliding die block 55, a mounting recess 56 is cut into the parting face 51 of the die block 50, as will be evident in Figs. 6 to 9. The sliding die block 55 is disposed so as to project from the end of the main die block 50 that is to be located adjacent to the heading tool 42, and the sliding die block 55 is resiliently urged toward the heading tool by spring means. As herein shown, the movement of the sliding die block 55 in a right-hand or releasing direction, as viewed in Figs. 6 and 7, is limited by guide rods 57 that are extended through bores 58 in the sliding die block 55 and are threaded into the main die block, as indicated at 59 in Fig. 7. Each of the rods 57 has a pair of stop nuts 60 thereon that are engaged by the die block 55 in the right-hand movement thereof, and the sliding die block 55 is urged in such a right-hand direction by expansive coil springs 61 that surround the guide rods 57. In the present case the opposite ends of the springs 61 are disposed in counterbores in the sliding die block 55 and in the main block 50, and it will be observed that when the springs 61 have moved the sliding die block to the right and into engagement with the nuts 60, there is a substantial space between the inner end 63 of the sliding die block 55 and the inner end or face 64 of the recess 56. The details of form and mounting of the sliding die block 55 will be fully described hereinafter. The space that is thus afforded between the surface 63 of the sliding die block and the surface 64 of the recess 56 constitutes the space that must be substantially taken up in the operation of the sliding die, and the upset on the work piece W is formed in the die cavity of the die so that any flash that is formed will be disposed in this space.

Thus the parting face 51 of the main die block between the surface 64 and the left-hand end, as viewed in Fig. 6, is formed with a die cavity that includes a grip portion 65 and an upset cavity portion that is tapered as at 66 so as to be complemental to the tapered portion 48 of the finished work piece and that also affords a semi-cylindrical portion 67 that is complemental to the cylindrical portion 47 of the upset that is to be formed on the work piece W. The upset cavity also includes an enlarged semi-cylindrical portion 68 that is complemental to a portion of the flange portion 46 of the upset, and it will be observed that this portion 68 of the upset cavity has an axial length somewhat less than the axial dimension of the flange 46. Thus the balance of the flange 46 is formed and defined by a semi-cylindrical upset cavity 69 formed in the end 63 of the sliding die block 55, the upset cavity 69 being merged with a semi-cylindrical grip cavity 70 formed in the sliding die block 55 so as to extend to the right-hand end thereof, as viewed in Fig. 6 of the drawings. Thus in the operation of the sliding die as will be hereinafter evident, the operation of the sliding die is such that the parting line flash 71 is formed as shown in Fig. 4 between the surface 64 of the recess 56 and the adjacent end 63 of the sliding die block 55.

In the operation of the sliding die, the heated bar or work piece W of cylindrical stock is placed in the relationship shown in Fig. 3 in the stationary grip die 40 and the cycle of operation of the machine is started so that the movable grip die 40 moves into engagement with the stationary grip die to thereby hold the stock in place. After the stock has been firmly gripped, the advancing movement of the header slide 26 moves the heading tool 42 into the end of the die cavity 70 formed between the two sliding die blocks 55. As this movement progresses, an annular shoulder 42A on the heading tool 42 engages the ends of the opposed sliding die blocks 55 so that in the continuing advancing movement of the heading tool, the sliding die blocks 55 are moved to the left from the position of Fig. 3 to the position of Fig. 4. During such movement of the sliding die blocks 55, the stock of the work piece is gathered or upset so as to fill the upset cavity in the dies and force the excess material outwardly as flash 71, as indicated in Fig. 4. The header slide 26 is then retracted to the position of Fig. 3, and the gripping dies are released, and as such release of the gripping dies takes place, the springs 61 serve to force the sliding die blocks 55 back to their initial positions of Figs. 6 and 7.

In some instances the action of the springs 61 may cause objectionable hammering of the parts of the sliding die blocks 55 with other elements of the dies, and in such an instance a dashpot 75 is provided, the cylinder of which is mounted in fixed relation in a bore 76 in the right-hand end of the sliding die block 55, as viewed in Fig. 6. The dashpot 75 has a piston 75A mounted on a stationary piston rod 77 that extends to the left in Fig. 6 through a bore 78 formed in the die block 55. The end of the rod 77 is screw threaded at 79 into an anchor plate 80 secured in the left-hand end of the main die block 50, as will be evident in Fig. 6 of the drawings. The right-hand end of the cylinder of the dashpot has a restricted port 81 so that when the sliding die block 55 is forced to the left, the air in the right-hand end of the cylinder, Fig. 6, may be forced out of the cylinder through the port 81. When the dies are released as hereinbefore described, the springs 61 tend to force the sliding die blocks 55 to the right as viewed in Fig. 6 and air will be drawn into the right-hand end of the cylinder 75 through the restricted port 81. The air in the left-hand end of the cylinder must of course be compressed during such return movement of the slides, and the compression of this air and the restricting action of the port 81 serve to afford a dashpot action to cushion the return movement of the die blocks 55.

It will be recognized that when the material of the stock or work piece W is being gathered and upset, the outward or lateral forces applied by the material to the sides of the die cavity 70 will be extremely great, and it is usually considered that such forces are greatest in that portion of the die cavity 70 that is adjacent to the upset cavity 69, the general point of application of such major forces being indicated by the arrow 85 in Fig. 6. In accordance with the present invention, the sliding die blocks 55 are so mounted and supported in the main die block 50 that even though the lateral forces on the sliding die block may be unevenly distributed, or may in effect have an unbalancing or tilting action upon the sliding die block, such unbalancing or tilting action is effectually resisted in such a manner that objectionable wear on the sliding bearing means is avoided. In attaining this result, the bearing means for the sliding die block 55 are arranged so as to effectually resist the lateral forces applied to the die blocks without involving excessive bearing pressures, and this is attained by disposing a substantial portion of the bearing surfaces for the sliding die blocks at points displaced a substantial distance from the point of application of the major lateral forces, thereby to enable the reactive forces in the bearings to resist the lateral tilting forces with a substantial mechanical advantage.

Thus, as will be evident in Figs. 6 to 9 of the drawings, the main die block 50 is formed with an elongated bearing groove 90 cut into the pressure face 52 of the die block so as to extend parallel to the longitudinal axis of the die cavity. The bearing or mounting groove 90 is of such a depth that it opens into the mounting recess 56, as will be evident in Figs. 6 and 8, while in the left-hand portion of the die block, as viewed in Fig. 6, the groove 90 is spaced a substantial distance from the innermost surface of the die cavity 65. The mounting or bearing groove 90 has its outer corners rabbeted as at 91 and a thrust plate 92 that is channel-like in cross section is disposed in the rabbeted groove 91 so as to close the outer face of the mounting groove 90. The thrust plate 92 serves to support a removable bearing plate 93 that extends throughout substantially the entire length of the main die block 50, and the sliding die block 55 is so formed that it has a flat bearing engagement with the bearing plate 93 throughout substantially the entire length of the bearing plate. Thus, as shown in Fig. 8, the sliding die block 55 has a relatively wide bearing rib 94 that is formed integrally with the die block so as to extend longitudinally thereof, and the rib 94 is complemental to the form of the mounting slot or groove 90 so that the flat bearing surface 95 of the rib 94 has a flat bearing engagement with the bearing plate 93. As will be evident in Figs. 5 and 6, the bearing rib 94 is extended beyond the end surface 63 of the die block 55 so that an extending bearing arm 94A is afforded as a uniform and rigid continuation of the rib 94. Thus the rib 94 and its extending arm 94A have a uniform engagement with the bearing plate 93 throughout a substantial portion of the length of the bearing plate 93, and the cross sectional form of the arm 94A is such that the surface 95A thereof not only engages the bearing plate 93, but the surface 96 is firmly or snugly engaged with what might be termed the bottom of groove 90. This effectually seals the bearing groove 90 against entry of scale or other foreign material from the space between the surface 63 and 64, and hence the bearing surfaces are fully and efficiently protected.

It will be evident that when the application of the upsetting force to the work piece W causes lateral forces, such as the force indicated at 85, to be applied to the sliding die block 55, such lateral forces will be resisted by all of the bearing area that is effective between the rigid arm 94A and the bearing plate 93, and such wide distribution of the resisting forces insures that excessive bearing pressures will not be encountered, and cutting or excessive wearing of the bearing 93 and of the opposite bearing surfaces 95 and 95A will be avoided. Moreover, the reactive bearing forces that are effective near the end of the arm 94A act through a substantial lever arm to prevent outward displacement of the inner end of the sliding die block 55; and the existence of such a mechanical advantage afforded by the arm 94A minimizes the bearing pressures and thereby reduces bearing wear. The fact that the arm 94 fits snugly in the groove 96 so as to prevent entry of scale or other objectionable material contributes materially to the long life that has been attained in the bearing surfaces through the use of the present invention.

Where the sliding die of the present invention is utilized, it has been found that the wear in the bearings of the sliding die block is so small that the sliding die may be utilized for many days in high production work without replacement of the bearing plate 93, and because of this it is possible to produce accurately sized upset forgings on a quantity production basis. The cost of such forgings is accordingly reduced because of the reduction in the upkeep of the dies and the reduction in the loss of time incident to repair and replacement of the dies. It will also be evident that the novel and advantageous sliding die construction that has been afforded by the present invention enables higher work pressures to be used where this is desirable, and this serves in many instances to reduce the number of passes or forging operations that are required in the production of a particular forging.

Hence, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In an upset forging die, a stationary gripping die and a movable gripping die disposed in opposed relation and each comprising an elongated main die block having a pressure face on one side thereof and an opposite face constituting a parting face adapted to match with a corresponding parting face on the opposed die block, said main die block having a die cavity formed in said parting face longitudinally of said block to afford a grip portion extending from one end of said die block for a substantial distance and also to afford an enlarged portion spaced from said end of said die block and constituting the upset cavity of the die, said die block having a relatively wide mounting slot formed therein opening into said parting face and extending between said upset cavity and the other end of said block, a mounting passage extended from said mounting slot for a substantial distance longitudinally toward said one end of the block and positioned between and in spaced relation to said pressure face and said die cavity, and a sliding die block mounted in said mounting slot and having a rigid bearing portion thereof extended slidably into said mounting passage.

2. In an upset forging die, a stationary gripping die and a movable gripping die disposed in opposed relation and each comprising an elongated main die block having a pressure face on one side thereof and an opposite face constituting a parting face adapted to match with a parting face on the opposed die block, said die block having a die cavity formed in said parting face longitudinally of said block to afford a grip portion extending from one end of said die block for a substantial distance and to also afford an enlarged portion spaced from said end of said die block and constituting the upset cavity of the die, said die block having a relatively wide mounting slot formed therein opening into said parting face and extending between said upset cavity and the other end of said block, a mounting passage extended from said mounting slot for a substantial distance longitudinally toward said one end of the block and positioned between and in spaced relation to said pressure face and said die cavity, a sliding die block mounted in mounting slot, means rigid with said sliding die block and extended slidably into said mounting passage, and cooperating bearing surfaces on said rigid means and in said mounting passage affording a sliding bearing operable to resist lateral forces applied to said sliding die block near said upset cavity.

3. In an upset forging die, a stationary gripping die and a movable gripping die disposed in opposed relation and each comprising an elongated main die block having a pressure face on one side thereof and an opposite face constituting a parting face adapted to match with a corresponding parting face on the opposed die block, said main die block having a die cavity formed in said parting face longitudinally of said block to afford a grip portion extending from one end of said die block for a substantial distance and also to afford an enlarged portion spaced from said end of said die block and constituting the upset cavity of the die, said die block having a relatively wide mounting slot formed therein opening into said parting face and extending between said upset cavity and the other end of said block, a mounting passage extended from said mounting slot for a substantial distance longitudinally toward said one end of the block and positioned between and in spaced relation to said pressure face and said die cavity, said mounting passage being defined by bearing surfaces completely about its periphery, and a sliding die block mounted in said mounting slot and having a rigid bearing portion thereof extended slidably into said mounting passage of a cross section to conform to said passage with a snug fit to form tightly contacting bearing surfaces for said sliding die block around the periphery of said passage to protect the same from dirt and scale by the snug fit of said rigid bearing portion within said mounting passage.

4. In an upset forging die, a stationary gripping die and a movable gripping die disposed in opposed relation and each comprising an elongated main die block having a pressure face on one side thereof and an opposite face constituting a parting face adapted to match with a corresponding parting face on the opposed die block, said main die block having an elongated groove formed longitudinally in the pressure face thereof, said die block having a mounting slot formed in said parting face thereof to such a depth as to meet and open longitudinally of said block into said groove and extended from one end of said die block toward the other end thereof but terminating in an end face located a substantial distance from said other end of said die block, a slide block mounted in said slot to afford a parting face disposed in the plane of the parting face of said die block and having a rigidly associated bearing arm extended longitudinally therefrom and disposed in said groove and extending throughout substantially the entire length of said groove, and bearing means including a bearing plate closing said groove in bearing relation to said slide block and said rigid bearing arm of said slide block and having an outer surface flush with said pressure surface of said die block.

ARTHUR R. NETTENSTROM.

REFERENCES CITED

The following references are of record in the file of this patent:

UNITED STATES PATENTS

| Number | Name | Date |
| --- | --- | --- |
| 345,573 | Cooke et al. | July 13, 1886 |
| 1,129,417 | Nelson | Feb. 23, 1915 |
| 1,150,479 | Zwiker | Aug. 17, 1915 |
| 1,207,948 | Long | Dec. 12, 1916 |
| 1,427,521 | Clouse | Aug. 29, 1922 |
| 1,458,294 | Hook | June 12, 1923 |
| 1,691,879 | Blakeslee | Nov. 13, 1928 |
| 2,270,819 | Gay | Jan. 20, 1942 |